United States Patent
LaFlame

[15] 3,690,428
[45] Sept. 12, 1972

[54] VISCOUS FLUID CLUTCH
[72] Inventor: Frank E. LaFlame, Dayton, Ohio
[73] Assignee: General Motors Corporation, Detroit, Mich.
[22] Filed: Dec. 28, 1970
[21] Appl. No.: 101,963

[52] U.S. Cl. ..........................192/58 B, 192/103 FA
[51] Int. Cl. ........................F16d 31/00, F16d 43/06
[58] Field of Search...192/58 R, 58 A, 58 B, 103 FA, 192/82 T

[56] References Cited

UNITED STATES PATENTS

| | | |
|---|---|---|
| 3,552,532 | 1/1971 | Thomas et al. ............192/58 B |
| 2,771,976 | 11/1956 | Smirl ................192/103 FA X |
| 3,587,801 | 6/1971 | Riner ........................192/58 B |
| 3,421,608 | 1/1969 | Gorder ................192/103 FA |
| 3,088,566 | 5/1963 | Fleming...................192/58 A |

*Primary Examiner*—Manuel A. Antonakas
*Attorney*—Warren E. Finken, A. M. Heiter and John P. Moran

[57] ABSTRACT

A viscous fluid clutch including relatively rotatable first and second drive members having a fluid shear space therebetween and which are cooperable with a fluid medium in the shear space to provide a shear-type fluid drive therebetween, an annular reservoir for at times storing the fluid medium, speed-responsive valve means for permitting the flow of the fluid medium from the annular reservoir to the fluid shear space at an intermediate range of engine speeds and for preventing flow therebetween at all lower and higher engine speeds.

5 Claims, 4 Drawing Figures

PATENTED SEP 12 1972

3,690,428

INVENTOR.
Frank E. LaFlame
BY
John P. Moran
ATTORNEY

VISCOUS FLUID CLUTCH

This invention relates generally to fluid drive devices, and, more particularly, to a fluid drive adapted to drive an accessory device, such as a cooling fan, for internal combustion engines.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and, as the speed of the engine increases, such as when the vehicle is running in direct drive at road speeds, the ram air cooling effect on the engine is increased and the necessity for fan cooling is diminished. The resultant lower fan speed at higher engine speeds reduces fan load and fan noise which otherwise could be disturbing to the occupants of the vehicle.

The device disclosed herein relates to an engine cooling fan drive mechanism wherein a viscous fluid, shear-type clutch is utilized to transmit power from the vehicle engine to the fan blade assembly.

An object of the invention is to provide improved means for automatically effecting a maximum limit in fan speed with increased engine speed above a predetermined value to better control fan noise.

Another and more specific object of the invention is to provide a viscous shear fan drive mechanism having a housing including a rear wall, a front wall, a divider wall therebetween, an operating or working chamber formed between the rear and divider walls for receiving a clutch plate in a viscous shear drive relationship with the housing, an annular reservoir formed between the divider and front walls, a continuously open outlet formed in the divider wall and cooperating pump or dam means for forcing the fluid from the reservoir and through the outlet into the operating chamber, and spring-loaded speed-responsive valve means for controlling an inlet formed in the divider wall between the operating chamber and the reservoir by permitting fluid flow therethrough during a predetermined intermediate range of engine speeds, while limiting the maximum fan speed at all higher engine speeds by opening and closing the inlet as required to control the volume of fluid in the operating chamber.

These and other objects and advantages will become apparent when reference is made to the following description and accompanying drawings, wherein.

Figures 1, 2, 3, 4:
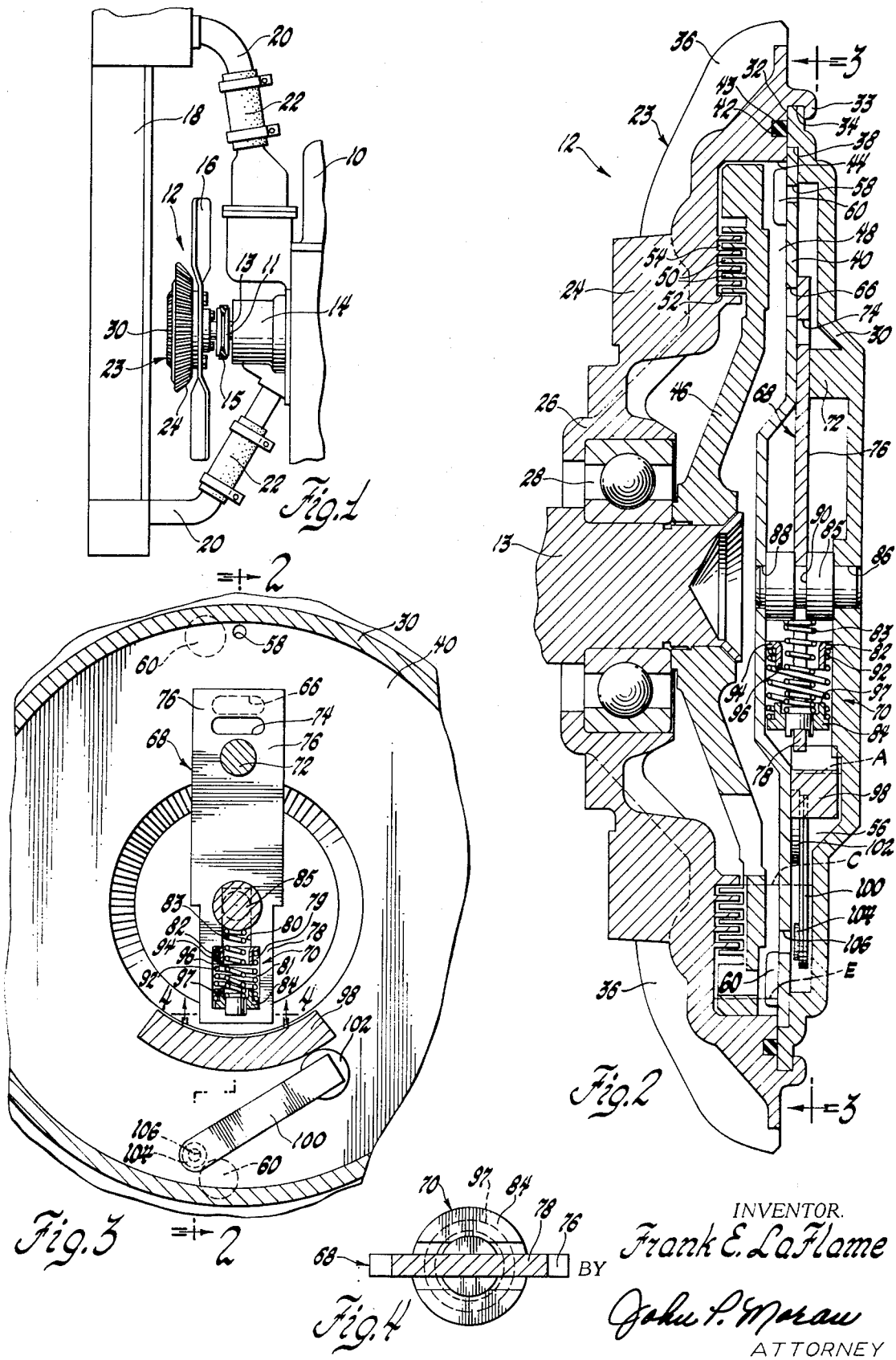
FIG. 1 is a fragmentary side elevational view of a radiator and engine having a viscous fluid clutch-driven cooling fan associated therewith.
FIG. 2 is an enlarged cross-sectional view of a viscous fluid, shear-type clutch embodying the invention.
FIG. 3 is a cross-sectional view taken on the plane of line 3—3 of FIG. 2, as if FIG. 2 were a full round view, and looking in the direction of the arrows.
FIG. 4 is an enlarged cross-sectional view taken on the plane of line 4—4 of FIG. 3, as if FIG. 3 were a full view, and looking in the direction of the arrows.

Referring to the drawings in greater detail, FIG. 1 illustrates an engine 10 having a viscous fluid clutch 12 and a pulley 11 mounted on a drive shaft 13 extending from the conventional water pump 14, the pulley 11 being rotated by a V-belt 15 connected to the crankshaft (not shown) for driving a cooling fan 16 secured to the clutch 12. The fluid clutch 12 and the cooling fan 16 are located between the engine 10 and a radiator 18. The usual conduits 20 and associated hoses 22 communicate between radiator 18 and the engine 10 adjacent the water pump 14.

Referring now to FIG. 2, the fluid clutch 12 includes a housing 23 which includes a rear wall member 24 having a hub 26 which is rotatably mounted by a suitable bearing 28 on the drive shaft 13. The housing 23 further includes a cover member or front wall 30 which has an annular flat surface 32 formed adjacent its peripheral edge, the latter being confined by an annular lip 33 in an annular recess 34 formed in the housing 23. Cooling fins 36 are formed on the outer surface of the rear wall member 24. A second annular recess 38 is formed in the cover member 30 radially inward of the outer periphery of the first annular recess 34. A divider wall 40 is confined adjacent its outer edge in the recess 38 intermediate the cover member 30 and the rear wall member 24. A seal 42 is compressed in an annular groove 43 formed in the rear wall member 24 intermediate the outer edges of the annular recesses 34 and 38. A third annular deeper recess 44 is formed in the rear wall member 24 radially inward of the second annular recess 38. A clutch plate 46 is secured at its center by any suitable means to the drive shaft 13, the outer peripheral portion thereof being freely located in an operating or working chamber 48 formed by the third annular recess 44.

Adjacent portions of the clutch plate 46 and the rear wall member 24 are provided with torque-transmitting elements consisting of cooperating annular ridge and groove elements 50 and 52, respectively, with an intervening fluid shear space 54 therebetween to accommodate a viscous fluid as a torque-transmitting medium.

It may be noted in FIG. 2 that the front wall or cover member 30 includes an annular bend intermediate the centers and peripheral edges thereof which forms an annular reservoir 56 with the divider wall 40. At least one pump outlet opening 58 is formed through the divider wall 40 adjacent a pump or dam element 60 formed on the divider wall 40, the opening 58 communicating between the operating chamber 48 and the annular reservoir 56. The pump element 60 may consist of a circular boss formed on the divider wall 40 by any suitable means, such as stamping, or it may be a rectangular-shaped or other-shaped member secured to the divider wall 40, such as by welding. It is to be understood that, in some applications, one outlet and one pump element may be sufficient, while other applications may require two such pumping arrangements.

An elongated inlet port 66 (FIG. 3) is also formed in the divider wall 40, communicating between the annular reservoir 56 and the working chamber 48 radially inward of the pump element 60 and the pump outlet opening 58. A valve member 68 of a valve assembly 70 is slidably mounted transversely across the annular reservoir 56 adjacent the inlet port 66, intermediate the divider wall 40 and a guide member 72 formed on the cover member 30. An elongaged opening 74 (FIG. 3) is formed in the upper portion 76 (FIGS. 2 and 3) of the valve member 68 for slidable radial alignment with the inlet port 66. As more clearly illustrated in FIG. 3, the upper portion 76 of the valve member 68 is substantially heavier than the lower portion 78 thereof for speed-responsive characteristics. An opening 79 having a pair of aligned rectangular opening portions 80 and 81 is formed in the lower portion 78 forming shoulders 82 between the portions 80 and 81.

A first resilient means, such as a spring 83, is mounted in the aligned opening portions 80 and 81 intermediate a transversely slotted cylindrical retainer 84 (FIGS. 2, 3 and 4) mounted on the radially outermost portion of the larger rectangular opening portion 81 and a fixed centrally located shaft member 85 which is mounted at its ends in openings 86 and 88 formed in the cover member 30 and the divider wall 40, respectively. An annular groove 90 (FIG. 2) is formed on the shaft member 85 to serve as a guide for the slidably mounted valve member 68, the latter being mounted around the member 85 at the smaller opening portion 80 formed therein. A second resilient means, such as a spring 92, is mounted around the first spring 83 intermediate the slotted spring retainer 84 and the flange 94 of a cylindrical spring retainer 96, the latter being slidably mounted within the larger rectangular opening portion 81 adjacent the shoulders 82. The springs 83 and 92 are separated on the retainer 84 by an annular ridge 97 (FIG. 2) formed thereon. As will be further described, the springs 83 and 92 resist the outward movement of the heavier valve portion 76 in two steps.

As further illustrated in FIG. 3, an arcuate-shaped counterweight 98 is formed on the divider wall 40 adjacent the retainer 84 of the lower valve portion 78. It may also be noted in FIG. 3 that, when desired, a bimetallic thermostatic valve stem 100 may be secured at one end 102 thereof to the divider wall 40, with a valve member 104 formed on the other end thereof for controlling fluid flow through an additional outlet port 106 formed in the wall 40 to supplement the flow through the pump outlet opening 58 during cool weather operation. As temperature increases, the valve 104 closes the port 106, leaving only the opening 58 operative for the pump-out operation. An additional pump element 60 is operative with the port 106, as with the opening 58.

OPERATION

So long as the vehicle engine 10 (FIG. 1) is in operation, the drive shaft 13 and the associated clutch plate 46 (FIG. 2) will be driven by the pulley 11 operatively connected via the belt 15 to the crankshaft (not shown) at an appropriate speed ratio with respect to engine speed. The initial position of the speed-responsive valve member 68 is such that the end portion thereof located radially outwardly of the opening 74 will be closed across the inlet port 66 in the divider wall 40, and will remain closed so long as the engine is operating below a predetermined speed, thus preventing any flow of fluid from the annular reservoir 56 into the working chamber 48. Since the pump outlet opening 58 is always open, providing continuous communication between the working chamber 48 and the annular reservoir 56, fluid will be pumped therethrough by virtue of the pump element 60 serving as a dam or wiper, forcing the fluid to flow into the opening 58 and, thence, into the annular reservoir 56. When the thermostatically controlled valve member 104 is employed, at ambient temperatures below a predetermined value, the member 104 will be raised from the outlet port 106, permitting fluid in the working chamber 48 to be quickly discharged therefrom while the engine is cold. Once the engine is warm, the valve member 104 will close against the outlet port 106 as a result of the movement of the bimetallic stem 100, and flow thereafter will be through the outlet port 58 only.

The total volume of fluid is such that when the working chamber 48 is substantially empty, i.e., at a level designated by broken line "E," FIG. 2, the fluid in the annular reservoir 56 will be held under the action of centrifugal force in the outer annular portion of the reservoir 56 with an inner annular liquid level "A," FIG. 2, the head resulting from the fluid height "A" being offset by the force generated by the pumping action of the pump element 60 on the fluid remaining in the working chamber 48, to prevent any flow-back through the outlet opening 58. Under this condition, commonly known as the "disengaged mode," the slip between the clutch plate 46 and the housing 23 is greatest.

As engine speed increases, the heavier portion 76 of the valve member 68 will tend to move radially outwardly (upwardly in FIG. 2) under the action of centrifugal force, initially against the force of the light spring 83 only. Up to approximately 1,000 rpm, fan 16 speed will generally follow engine 10 speed due to the residual fluid in the working chamber 48. Then, once 1,000 rpm engine-and-fan speed is reached, the force of the spring 83 will be overcome by centrifugal force, and the valve member 68 will rapidly move radially outwardly, uncovering the inlet port 66 as the opening 74 slides into alignment therewith. Radial outward movement of the heavier valve portion 76 is interrupted by the upper face (FIG. 3) of the flange 94 coming into contact with the adjacent outermost surfaces of the central shaft member 85.

Once the inlet port 66 is open, fluid will flow from the reservoir 56 through the port 66 into the working chamber 48, filling the shear space 54 and resulting in the so-called "engaged mode," or condition of least slip. So long as the port 66 remains open, the shear space 54 is constantly replenished to a substantially constant level, such as the level designated by "C" (FIG. 2), by virtue of the fluid being continuously pumped by the pump element 60 through the outlet port 58 and recirculating through the reservoir 56 and thence through the now open inlet port 66/74, such action constantly emptying the reservoir 56 to a level designated by "C" (FIG. 2). The force of the larger spring 92 is such that the inlet port 66 remains open and the engaged mode prevails throughout a predetermined engine speed range of, say, from 1,000 to 1,600 rpm. Throughout this range, the fan 16 speed varies proportionally with the engine 10 speed.

It has been found desirable to limit fan 16 speed to 1,600 rpm to avoid power loss and excessive noise. Accordingly, once 1,600 rpm engine speed is surpassed, the increased action of the resultant centrifugal force will overcome the force of springs 83 and 92, and thereby rapidly close off the inlet port 66, centrifugal force thereafter being increasingly greater than the combined spring 83, 92 force. Compression of the larger spring 92 occurs as a result of the spring retainer 96 abutting against the central shaft member 85, while the shoulders 82 move away therefrom as a part of the centrifugal force valve member 68. Once the inlet port 66 is closed, further increases in engine speed will cause the fluid in the working chamber 48 to be pumped therefrom by the pump element 60 through the outlet port 58 into the reservoir 56 to maintain the fan 16 at approximately 1,600 rpm. When the fan 16 speed drops below 1,600 rpm, as a result of the fluid level having decreased in the shear space 54, the heavier portion 76 of the valve member 68 will return radially inwardly, due to the valve assembly 70 being rotated by the cover member 30 in the divider wall 40, thereby once again uncovering the inlet port 66. Fluid will thereupon flow from the reservoir 56 through the port 66 back into the working chamber 48, raising the level of fluid in the shear space 54. This will cause the fan 16 to speed up resulting in the re-closing of the inlet port 66. Thus it is apparent that the maximum fan 16 speed will be maintained in the vicinity of 1,600 rpm at all engine speeds about 1,600 rpm.

It should be apparent that the invention provides improved centrifugal means for automatically maintaining a maximum fan speed at all engine speed above a predetermined value, thereby eliminating excessive fan noise.

While but one embodiment of the invention has been shown and described, other modifications thereof are possible.

I claim:

1. A viscous clutch comprising first and second relatively rotatable drive means, said first drive means having an annular operating chamber and a reservoir chamber, fluid shear drive means on said first and second drive means located in said operating chamber operable with a fluid medium to provide a shear-type fluid drive between said first and second drive means, said operating chamber having outlet opening means at an outer portion thereof and inlet opening means at an inner portion thereof, pump means on one of said drive means to pump said fluid medium from said operating chamber out of said outlet opening means into said reservoir chamber, and speed-responsive valve means operatively connected to said inlet opening means for permitting the flow of said fluid medium therethrough from said reservoir chamber to said operating chamber at an intermediate range of speeds of said second drive means and for preventing flow therethrough at all lower and higher speeds of said second drive means.

2. A viscous clutch comprising first and second relatively rotatable drive members, said first drive member including a first wall, a second wall and a divider wall sealed between said first and second walls providing a working chamber between said divider and second walls and a second chamber between said first and divider walls, said second drive member being rotatably mounted in said working chamber, fluid shear drive means on said first and second drive members in said working chamber operable with a fluid medium to provide a shear-type fluid drive therebetween, first opening means in said divider wall for providing communication from said working chamber to said second chamber, pump means on one of said drive members for causing said fluid medium to flow from said working chamber through said first opening means to said second chamber, second opening means formed in said divider wall for communicating said fluid medium from said second chamber to said working chamber, centrifugally responsive valve means slidably mounted in said second chamber for controlling the flow of said fluid medium from said second chamber through said second opening means into said working chamber by opening said second opening means only during a first predetermined intermediate range of speeds of said second drive member so as to maintain the speed of said first drive member at substantially a second predetermined speed range regardless of any change in speed of said second drive member above the upper limit of said first predetermined speed range.

3. A viscous fluid clutch comprising an input shaft, a clutch plate secured to said shaft, a fluid clutch housing rotatably mounted on said input shaft, a cover member sealed to said housing, a divider wall secured for rotation with said cover member and said housing and mounted between said cover member and said clutch plate so as to form an annular reservoir with said cover member and a working chamber with said housing, an outlet port formed in said divider wall between said working chamber and said annular reservoir, pump means operatively connected to said divider wall for pumping a fluid medium from said working chamber through said outlet port to said annular reservoir, an inlet port formed in said divider wall for at times communicating said fluid medium from said annular reservoir to said working chamber, speed-responsive valve means operatively connected to said divider wall for controlling the flow of said fluid medium through said inlet port from said annular reservoir to said working chamber, and resilient means operatively connected to said valve means for preventing said valve means from opening said inlet port below a first predetermined clutch housing speed and for reclosing said inlet port above a second higher predetermined clutch housing speed.

4. A viscous fluid clutch comprising first and second relatively rotatable drive members, said first drive member including front and rear walls and defining a fluid cavity therebetween, a divider wall sealed between said front and rear walls in said fluid cavity and dividing said fluid cavity into first and second chambers, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, a first opening formed in said divider wall for providing communication between said first chamber and said second chamber, a dam element formed on said divider wall in said first chamber adjacent said first opening for causing said fluid medium to flow through said first opening for varying the volume of said fluid medium in said shear space to vary the torque transmitted between said first and second drive members, a second opening formed in said divider wall for at times communicating said fluid medium from said second chamber to said first chamber, speed-responsive valve means for controlling the opening and closing of said second opening, first resilient means for preventing said valve means from opening said second opening below a first predetermined speed of said first drive member, and second resilient means for preventing said valve means from closing said second opening below a second higher predetermined speed of said first drive member.

5. A viscous clutch comprising first and second relatively rotatable drive members, said first drive member including a first wall, a second wall and a divider wall sealed between said first and second walls providing a working chamber between said divider and second walls and a reservoir chamber between said first and divider walls, said second drive member being rotatably mounted in said working chamber, fluid shear drive means on said first and second drive members in said working chamber operable with a fluid medium to provide a shear-type fluid drive therebetween, an outlet opening in said divider wall for providing communication from said working chamber to said reservoir chamber, pump means on one of said drive members for causing said fluid medium to flow from said working chamber through said outlet opening to said reservoir chamber, an inlet opening formed in said divider wall for communicating said fluid medium from said reservoir chamber to said working chamber, shaft means connected between said first and divider walls, centrifugally responsive valve means slidably mounted in said reservoir chamber with opening means around said shaft means, first spring means mounted in an opening formed in said valve means and having one end thereof movable at all times with said valve means and the other end thereof abutting against said shaft means, second spring means surrounding said first spring means in said opening and having one end thereof movable at all times with said valve means and the other end thereof movable at times with a shoulder formed on said valve means and at all other times abutting against said shaft means and caused to leave said shoulder, said first spring means compressing under the action of centrifugal force to permit said valve means to rapidly open said inlet opening at a first predetermined speed of said first drive member at which time said second spring means abuts against said shaft means to prevent said valve means from closing off said inlet opening until a second higher predetermined speed of said first drive member is attained.

* * * * *